United States Patent [19]
Medovar et al.

[11] 3,711,616
[45] Jan. 16, 1973

[54] ELECTRODE HOLDER, FOR INSTANCE, FOR AN ELECTROSLAG PLANT

[75] Inventors: Boris Izrailevich Medovar; Jury Fedorovich Alferov; Rudolf Solomonovich Dubinsky; Jury Vadimovich Latash; July Georgievich Emelyanenko; Vitaly Mikhailovich Baglai, all of Kiev, U.S.S.R.

[73] Assignee: Institut Elektrosvarki Imeni E.O. Patona Akademii Nauk Ukrainskoi SSR, Kiev, U.S.S.R.

[22] Filed: April 8, 1971

[21] Appl. No.: 132,431

[30] Foreign Application Priority Data

April 16, 1971 U.S.S.R. ............................1,422,424

[52] U.S. Cl. ..................................................13/16
[51] Int. Cl. ..............................................H05b 7/10
[58] Field of Search..........................13/14, 15, 16, 17

[56] References Cited

UNITED STATES PATENTS 1,809,656  6/1931  Walter....................................13/16
3,293,347  12/1966  Wooding..................................13/14

Primary Examiner—Roy N. Envall, Jr.
Attorney—Holman & Stern

[57] ABSTRACT

An electrode holder, for instance, for an electroslag plant, comprises a clamping member in the form of a rod locating the electrode in a working position relative to a plant frame, and a supporting member arranged on the frame; the supporting member has an inclined surface on which surface is placed the clamping member mating with the electrode and displacing over the above surface under the action of the mass of the electrode and making it thereby fast with respect to the plant frame.

6 Claims, 3 Drawing Figures

ELECTRODE HOLDER, FOR INSTANCE, FOR AN ELECTROSLAG PLANT

The present invention relates to the facilities for special electrical metallurgy and, more particularly, to electrode holders, which may find application, for example, in electroslag plants for the remelting of metals and/or alloys or for electroslag welding.

Known in prior art are electrode holders used in electroslag and other plants in which electrodes are located through the use of jaws, spring-loaded lever clamps or screw clamps, set up on the plant frame.

Peculiar to the above electrode holders are sophisticated electrode clamping and unclamping mechanisms, as well as the necessity for laborious manual operations which may arise on certain occasions.

The electrode holders for multi-electrode furnaces, such as, a seven-electrode furnace with portable grippers, are especially intricate and uneasy to work with.

It is an object of the present invention to eliminate the above disadvantages.

The present invention is, in essence, aimed at designing an electrode holder, preferably for electroslag units, featuring a simplified design, positive grip of the electrode relative to the unit frame or the electrode lead and a comparatively compact construction which is of particular importance in using the above electrode holders in multi-electrode plants.

It is achieved by the fact that in an electrode holder comprising a clamping member, locating the electrode in a working position with respect to the plant frame, and a supporting member arranged on that frame, the supporting member has, according to the present invention, an inclined surface which carries the clamping member conjugated with the electrode and shifted over the slope under the effect of the mass of said electrode making it fast relative to the plant frame.

The clamping member may be made in the form of a roller and it would be expedient to equip its ends with bearings to roll it over the surface of the supporting member.

The bearings tend to reduce friction when the roller is displaced over the inclined surface of the supporting member.

The upper part of the electrode, not subjected to flashing shall preferably be fitted with a lateral slot which will accommodate the clamping member during the location of the electrode.

In addition, it would be expedient to pass through the supporting member a shaft to mount at its ends swivel arms each having a groove to receive mounted loosely therein opposite ends of the clamping member.

This facilitates the introduction of the clamping member into the lateral slot to ensure their mating in the course of locating the electrode.

A hole may be made in the upper unflashed portion of the electrode in lieu of the slot with the clamping member passing through that hole.

The electrode holder, made in conformity to the present invention, will allow successful achievement of the above objects.

To make the nature of the present invention more fully apparent given below is a detailed description of an exemplary embodiment of the proposed electrode holder in compliance with the present invention to be considered in conjunction with the accompanying drawings, wherein.

Figure 1:
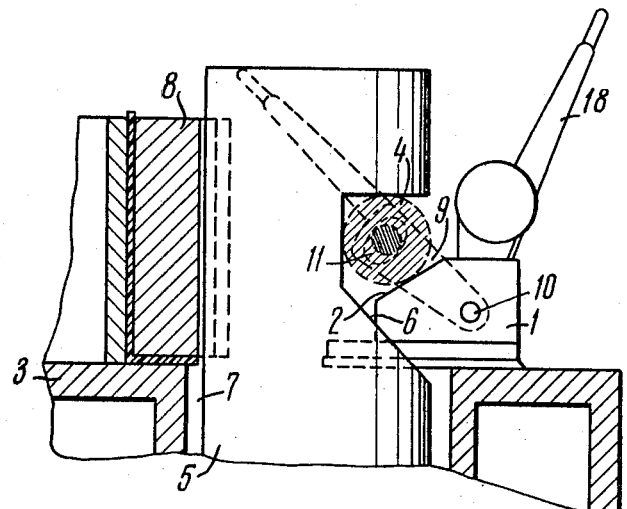
FIG. 1 is a general view of the electrode holder.

As shown in FIG. 1, the proposed electrode holder incorporates supporting member 1 with an inclined surface 2 located on casing 3 of a furnace, and clamping member 4 mating with electrode 5 on inclined surface 2 of supporting member 1. In the embodiment, being described, clamping member 4 is a roller, yet it may have any other configuration.

In locating electrode 5 relative to the furnace casing 3 said clamping member 4 is admitted in lateral slot 6 either in the upper part of electrode 5 or in a universal detachable head coupled to the electrode.

Location of electrode 5 in relation to casing 3 is as follows: Electrode 5 is fed into seat 7 until clamping member 4 is aligned with lateral slot 6. Under the action of the mass of electrode 5 clamping member 4 is displaced over inclined surface 2 of supporting element 1, forcing electrode against current-carrying plate 8, making fast thereby electrode 5 relative to casing 3. The angle of inclination of surface 2 of supporting member 1 can be chosen to vary with the electrode mass and the force needed for clamping the electrode to the current-carrying plate to ensure a reliable electrical contact between them.

In situations where voltage is supplied to an electrode through the use of additional devices, the electrode is forced directly against the casing. In such a construction the angle of inclination of surface 2 is chosen based on the conditions ensuring a reliable and secure contact of the electrode with respect to the casing proper.

To facilitate insertion of clamping member 4 into slot 6 of electrode 5, supporting member 1 is fitted with swivel arms 9 mounted on axle 10 which is passed through supporting member 1. Each arm 9 has an oval groove 11 intended to accommodate one of the ends of a clamping member 4, the groove dimensions being such that the groove will not interfere with the free displacement of clamping member 4 over inclined surface 2 of supporting member 1.

Figure 2:
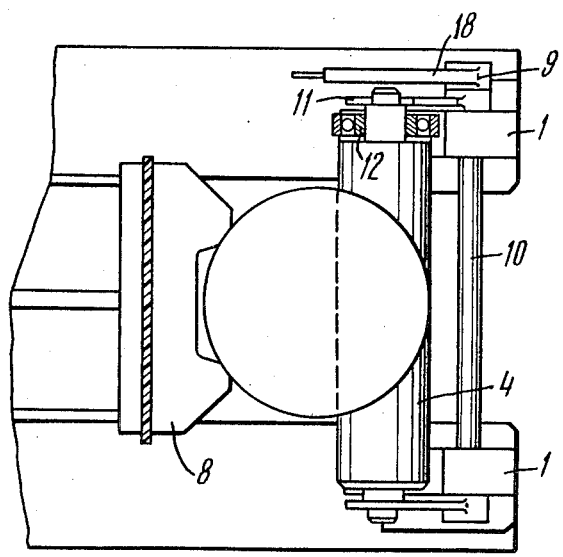
FIG. 2 depicts a plan view of the electrode holder of FIG. 1.

In order to reduce any friction in displacing clamping member 4 over inclined surface 2 of supporting member 1, the opposite ends of clamping member 4 are equipped with bearings 12 (FIG. 2), rolling over the surface of supporting member 1.

Clamping member 4 may alternatively be mated with electrode in other ways.

For instance, drilled in the upper part of electrode 5 may be a diametrical hole through which clamping member 4 is passed. The operational principle is in that case similar to that described above.

Figure 3:
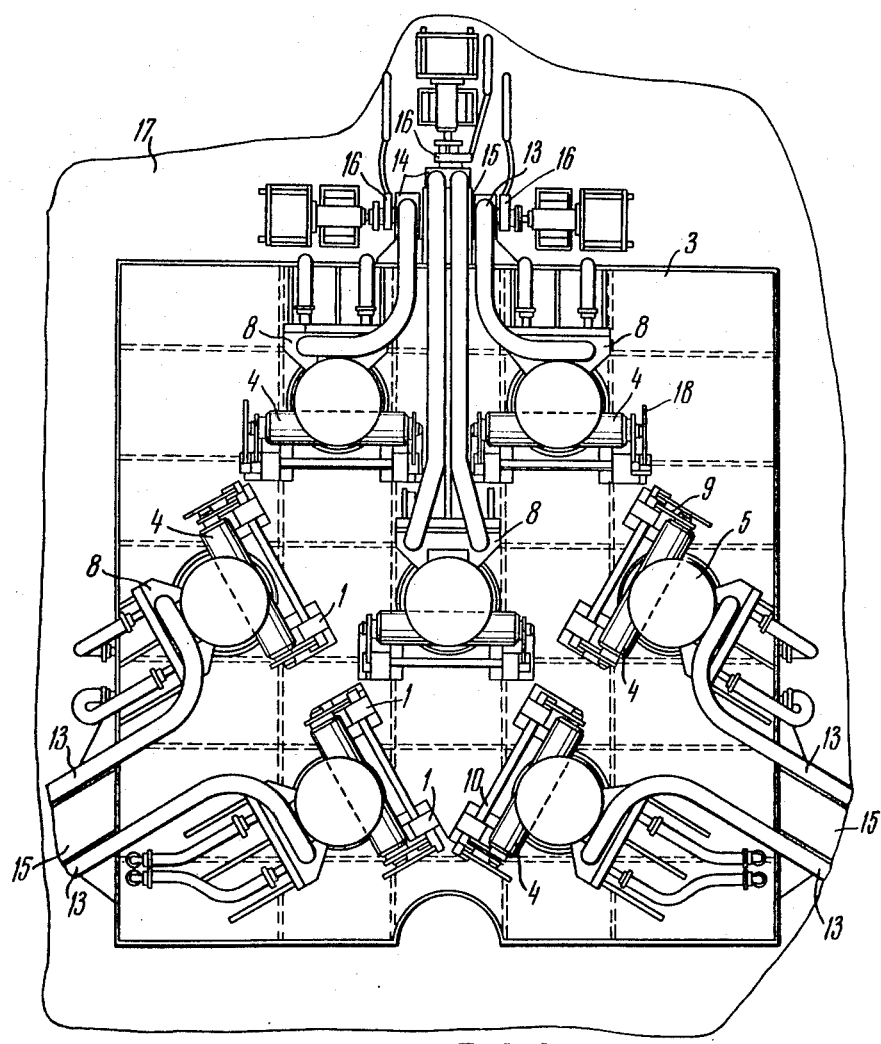
FIG. 3 represents a plan view of a seven-electrode plant.

The proposed electrode holder is perfectly simple and yet provides the most efficient appliance for clamping the electrodes and supplying operating voltage to them, to be employed in multi-electrode furnaces and in the seven-electrode electroslag furnace, shown in FIG. 3, in particular. As can be seen from FIG. 3, electrodes 5 are fastened in casing 3 fitted respectively with seven seats, with current-carrying plates 8 being secured in each seat, so that they are insulated from casing 3. Voltage to plates 8 is supplied from plates 14, located on lugs 15 of casing 3, via buses 13 and plug contacts 16. In a working position casing 3 is mounted on upper cross-arm 17 of the electroslag furnace. On two sides of each seat set up isolated from casing 3 are supporting members 1 made in the form of shoes with oblique surfaces. Passed through supporting members 1 is axle 10 on which swivel arms 9 are fastened. Clamping member 4 which is a roller, is placed on the oblique surfaces of members 1. Swivel arms 9 are moved with the aid of handle 18 (see FIGS. 1 and 2) fitted on axle 10. Each electrode of this furnace is equipped with a universal detachable head having a lateral slot (not shown in FIG.3) with the electrode diameter being larger than that of the head.

With the aid of a crane, electrode 5 is fitted into appropriate seat with the universal detachable head facing upwards. During its lifting motion the face of the universal detachable head repulses the roller in the upper position with the length of arms 9 so chosen that the roller, resting on arms 9, remains in that position. When the slot in the universal detachable head is on the same level with shoes 1, the roller, through the use of handle 18, is conjugated with the wall of the slot in the universal head. Next the electrode is lowered until it is made fast. In order to remove the electrode stubs, it is sufficient to raise them by a crane. The chamfered edge of the slot will push the roller out of its position allowing the electrode stub free through the electrode seat downwards.

As seen from the above example, simplicity, reliability and ease in operation are the primary features of the proposed device.

What is claimed is:

1. An electrode holder for vertically mounting an electrode in a plant casing such as a casing of an electroslag plant, comprising, in combination: a vertically disposed electrode in an aperture in the plant casing; a current supplying member disposed to contact one side of the electrode, said current carrying member being insulatingly secured to the plant casing; a supporting member facing said current supplying member and secured to said plant casing substantially diametrically opposite said current-carrying member and having an inclined surface sloping downwardly towards an axis of said electrode; and a clamping member in the form of a rod disposed to supportingly carry the electrode weight and resting horizontally on said inclined surface and means provided on the electrode for supporting said rod whereby by virtue of the weight of the electrode which is supported by the rod and the tendency of the rod to slide down the inclined surface, the electrode is pressed laterally of the axis thereof against said current-carrying member and securingly mounted in position.

2. An electrode holder as in claim 7, in which the said clamping member is made in the form of a roller.

3. An electrode holder as in claim 2, in which opposite ends of the said roller are equipped with bearings to enable said rod to roll over the inclined surface of said supporting member.

4. An electrode holder as in claim 1, in which said means provided on the electrode for receiving said rod includes a lateral slot in an upper part of said electrode a lateral slot.

5. An electrode holder as in claim 1 in which said clamping member is a hollow rod, and, passing through said supporting member is an axle carrying at its ends swivel arms each having a groove into which the opposite ends of the said axle fit loosely.

6. An electrode holder as in claim 1 in which an upper part of the electrode has a lateral slot through which the rod of said clamping member is passed.

* * * * *